United States Patent
Chang et al.

(10) Patent No.: US 9,146,754 B2
(45) Date of Patent: Sep. 29, 2015

(54) BOOTING METHOD AND COMPUTER SYSTEM THEREOF

(75) Inventors: Chuan-Te Chang, Taipei (TW); Nan-Kun Lo, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 1505 days.

(21) Appl. No.: 12/336,543

(22) Filed: Dec. 17, 2008

(65) Prior Publication Data

US 2009/0183017 A1    Jul. 16, 2009

(30) Foreign Application Priority Data

Jan. 16, 2008    (TW) ................................ 97101628 A

(51) Int. Cl.
*G06F 9/445*    (2006.01)

(52) U.S. Cl.
CPC .............. *G06F 9/44505* (2013.01); *G06F 8/67* (2013.01)

(58) Field of Classification Search
CPC .............................. G06F 8/67; G06F 11/1417
USPC .......................................... 713/1, 2, 300, 323
See application file for complete search history.

(56) References Cited

U.S. PATENT DOCUMENTS

| | | | |
|---|---|---|---|
| 2004/0073842 A1* | 4/2004 | James et al. | 714/36 |
| 2004/0093592 A1* | 5/2004 | Rao | 717/168 |
| 2005/0138348 A1* | 6/2005 | Bolay et al. | 713/100 |
| 2005/0177709 A1* | 8/2005 | Kim | 713/1 |
| 2005/0223245 A1* | 10/2005 | Green et al. | 713/300 |
| 2006/0143600 A1* | 6/2006 | Cottrell et al. | 717/168 |
| 2007/0220282 A1* | 9/2007 | Huang | 713/300 |
| 2008/0086652 A1* | 4/2008 | Krieger et al. | 713/330 |
| 2009/0150662 A1* | 6/2009 | Desselle et al. | 713/100 |

\* cited by examiner

*Primary Examiner* — Kim Huynh
*Assistant Examiner* — Brandon Kinsey
(74) *Attorney, Agent, or Firm* — Jianq Chyun IP Office

(57) ABSTRACT

A booting method and a computer system thereof, suitable for rebooting the computer system when a setting value of a basic input output system (BIOS) is modified, are provided. When a modified setting value causes a situation in which a main power is cut off in advance and the computer system is rebooted, a control command is sent to a signal generator for controlling the signal generator to generate a control signal through the BIOS. Then, the control signal is transmitted to a switch by the signal generator for controlling the switch to be turned on or turned off. Afterwards, a power-failure signal transmitted by a chipset is changed by the switch, such that a power supply provides the main power continuously to reboot the computer system.

11 Claims, 3 Drawing Sheets

1

BOOTING METHOD AND COMPUTER SYSTEM THEREOF

CROSS-REFERENCE TO RELATED APPLICATION

This application claims the priority benefit of Taiwan application serial no. 97101628, filed on Jan. 16, 2008. The entirety of the above-mentioned patent application is hereby incorporated by reference herein and made a part of this specification.

BACKGROUND OF THE INVENTION

1. Field of the Invention

The present invention generally relates to a booting method, in particular, to a method of rebooting a computer system when a setting value of a basic input output system (BIOS) is modified.

2. Description of Related Art

A chipset plays an extremely important role in a common computer system. Recently, along with the rapid development of the technology, the functions of the chipset become even powerful. The chipset manufacturer Intel has researched and developed a set of management engines with powerful functions on the produced chipsets, so as to remote control and manage the status of the local computer system.

As for a computer system using such chipsets (for example, Intel (ICH7, ICH8, and ICH9 series), when a user modifies a setting value, such as a memory setting value and a switch setting value of a network card, the computer system cuts off the main power and then is rebooted.

However, the main power provides power to devices of the computer system including central processing unit (CPU), hard disk, and optical disc drive, so that the motion of frequently cutting down the main power and then rebooting the computer system immediately may cause permanent damage on the hardware such as the hard disk. What's worse, important data may be lost.

SUMMARY OF THE INVENTION

Accordingly, the present invention is directed to a booting method, suitable for directly rebooting a computer system when a setting value of a basic input output system (BIOS) is modified, thus avoiding a situation of turn off the power and then rebooting the computer system.

The present invention is also directed to a computer system, which utilizes a switch to forcedly control the power supply to provide power continuously, without cutting off the main power.

As embodied and broadly described herein, the present invention provides a booting method, suitable for rebooting a computer system when a setting value of a basic input output system (BIOS) is modified. When a modified setting value requires cutting off the main power in advance and then rebooting the computer system, a control command is sent to a signal generator, such that the signal generator generates a control signal. Then, the control signal is transmitted to a switch through the signal generator for controlling the switch to be turned on or turned off. Thereafter, a power-failure signal transmitted by a chipset is changed by the switch, such that a power supply provides the main power continuously. Finally, as the main power is provided continuously, the computer system is rebooted.

In an embodiment of the present invention, before the step of sending the control command to the signal generator, the method further includes determining whether the modified setting value requires cutting off the main power and rebooting the computer system or not, if yes, the control command is sent to the signal generator; otherwise, the computer system is rebooted directly.

In an embodiment of the present invention, after the step of sending the control command to the signal generator, the method further includes sending a power-failure signal to the chipset, such that the chipset sends the power-failure signal. In an embodiment of the present invention, after the step of sending the control command and rebooting the computer system, the method further includes sending a restore command to the signal generator, such that the signal generator sends a restore signal to the switch to restore the switch to an original state, and the power supply receives the power-failure signal transmitted by the chipset.

The present invention provides a computer system, which includes a power supply, a BIOS, a chipset, a signal generator, and a switch. The power supply is used to provide a main power to the computer system. The BIOS is used to determine whether a modified setting value thereof requires cutting off the main power and rebooting the computer system or not, and is used to send a control command when it is determined that the modified setting value requires cutting off the main power and then rebooting the computer system. The chipset is respectively coupled to the BIOS and the power supply, for transmitting a power-failure signal. The signal generator is coupled to the BIOS, for receiving the control command transmitted by the BIOS, so as to generate a control signal. The switch is coupled to the signal generator, and coupled between the chipset and the power supply, for receiving the control signal transmitted by the signal generator, so as to change the power-failure signal transmitted from the chipset, such that the power supply provides the main power to the computer system continuously, so as to reboot the computer system.

In an embodiment of the present invention, after sending the control command, the BIOS further sends a power-failure signal to the chipset, such that the chipset transmits a power-failure signal. In addition, the BIOS may send a restore command to the signal generator, such that the signal generator sends a restore signal to the switch, so as to restore the switch to an original state, and the power supply receives the power-failure signal sent by the chipset.

In an embodiment of the present invention, the switch is a bipolar junction transistor (BJT) or a metal oxide semiconductor (MOS) transistor.

In the present invention, a switch is set between the power supply and the chipset, so as to change the power-failure signal sent by the chipset. When the user modifies a setting value in a BIOS setting menu that requires turn off the power and then rebooting the computer system, the BIOS sends a control command, so that the switch is utilized to change the power-failure signal transmitted by the chipset, and thus the power supply does not receive the power-failure signal. Therefore, the motion of frequent turn off the power and then rebooting the computer system may be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
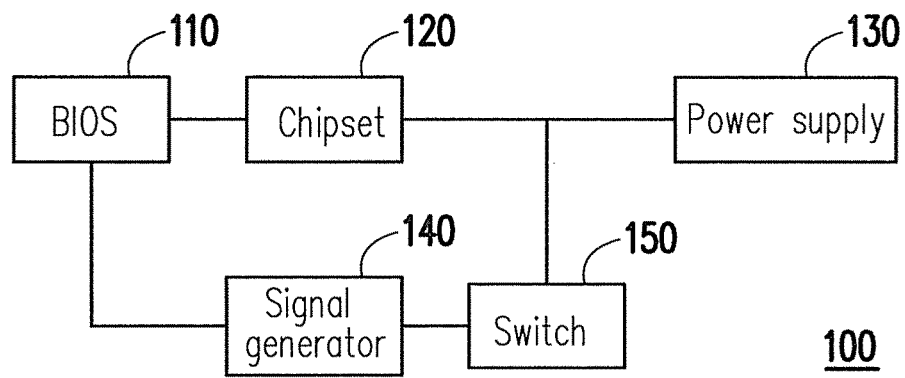
FIG. 1A is a block diagram of a computer system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Generally, after modifying certain setting values (such as setting values of the chipset) in a BIOS, the computer system cuts off the main power, and then reboots the computer system. However, the motion of frequently turn off the power may cause permanent damage to the hardware such as the hard disc. Therefore, the present invention provides a booting method and a computer system thereof, which is suitable for rebooting the computer system without cutting off the main power. In order to make the content of the present invention more comprehensive, embodiments are illustrated below as examples for implementing the present invention.

FIG. 1A is a block diagram of a computer system according to an embodiment of the present invention. Referring to FIG. 1A, a computer system 100 includes a BIOS 110, a chipset 120, a power supply 130, a signal generator 140, and a switch 150. The chipset 120 is coupled to the BIOS 110 and the power supply 130 respectively. The signal generator 140 is coupled to the BIOS 110. The switch 150 is coupled to the signal generator 140, and coupled between the chipset 120 and the power supply 130.

The BIOS 110 is used to determine whether a modified setting value thereof requires cutting off a main power and rebooting the computer system 100 or not, and is used to send a control signal when the modified setting value requires cutting off the main power and then rebooting the computer system. Generally speaking, a setting menu of the BIOS 110 includes a plurality of setting values, and the setting values may be classified into two classes, namely, a class "requiring turn off the power and rebooting the computer system" after being modified, and a class "not requiring turn off the power and rebooting the computer system" after being modified. The setting values "requiring turn off the power and rebooting the computer system" include, for example, memory speed, memory parameter, or system external frequency, and the like. The setting values "not requiring turn off the power and rebooting the computer system" include, for example, order of boot disc, system time, and the like.

Furthermore, besides sending the control command to the signal generator 140, the BIOS 110 further sends a restore command to the signal generator 140 after the switch 150 is turned on and the computer system 100 is rebooted, such that the signal generator 140 sends a restore signal to the switch 150, so as to restore the switch 150 to an original state. That is to say, the switch 150 in the turned-on state is restored to such a state that the power-failure signal sent by the chipset 120 is transmitted to the power supply 130 successfully.

The chipset 120, for example, a south/north bridge chipset, determines whether to transmit the power-failure signal or not according to the modified setting value of the BIOS 110. That is to say, when the modified setting value of the BIOS 110 requires turn off the power and rebooting the computer system, the BIOS 110 sends a power-failure signal to the chipset 120, such that the chipset 120 transmits the power-failure signal. Here, the power-failure signal indicates that the BIOS 110 requires turn off the power for the computer system.

The power supply 130 is used to provide a main power to the computer system 100. The signal generator 140 is used to receive the control command transmitted by the BIOS 110, so as to generate a control signal. The signal generator 140 is, for example, but not limited to, a super input output (SIO) chip, or any device or chip capable of providing input output (I/O) signals, which is not limited herein.

The switch 150 is turned on after receiving the control signal transmitted by the signal generator 140, so as to change the power-failure signal sent by the chipset 120, such that the power supply 130 does not cut off the main power but provides the power to the computer system 100 continuously, and then reboots the computer system 100. The switch 150 is, for example, a BJT or an MOS transistor.

Figure 1B:
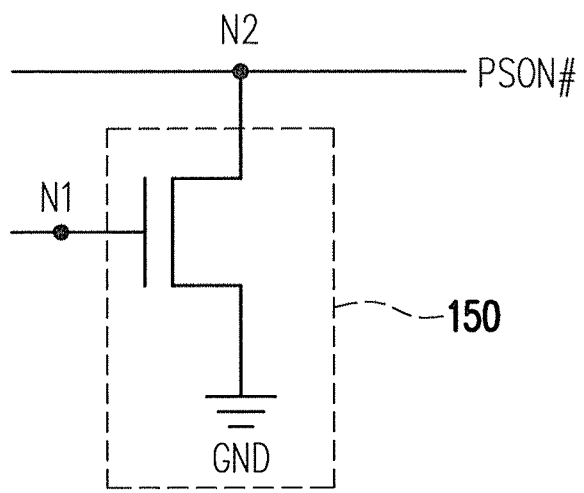
FIG. 1B is a schematic view of an actuation of a switch according to an embodiment of the present invention.

For example, FIG. 1B is a schematic view of a switch according to an embodiment of the present invention. Referring to FIGS. 1A and 1B together, a pin PSON# is a pin set on the power supply 130. In addition, for sake of illustrating conveniently, a node N1 is depicted at a gate of the switch 150 in FIG. 1B, and a node N2 is depicted between the switch 150 and the pin PSON#.

In this embodiment, it is assumed that the switch 150 is an NMOS transistor, and it is assumed that when the pin PSON# of the power supply 130 receives a signal at a high logic level, an output end of the power supply 130 does not output the main power, that is, being cut off; whereas, when the pin PSON# of the power supply 130 receives a signal at a low logic level, the output end of the power supply 130 provides the main power continuously.

When the node N1 receives the control signal at a high logic level transmitted by the signal generator 140, the switch 150 is turned on. At this time, since the switch 150 is turned on, the signal of the node N2 is pulled to a ground level of a ground end GND, so as to become a signal at a logic low level. At this time, the signal received by the pin PSON# is at a low logic level, the output end of the power supply 130 outputs the main power continuously.

Figure 2:
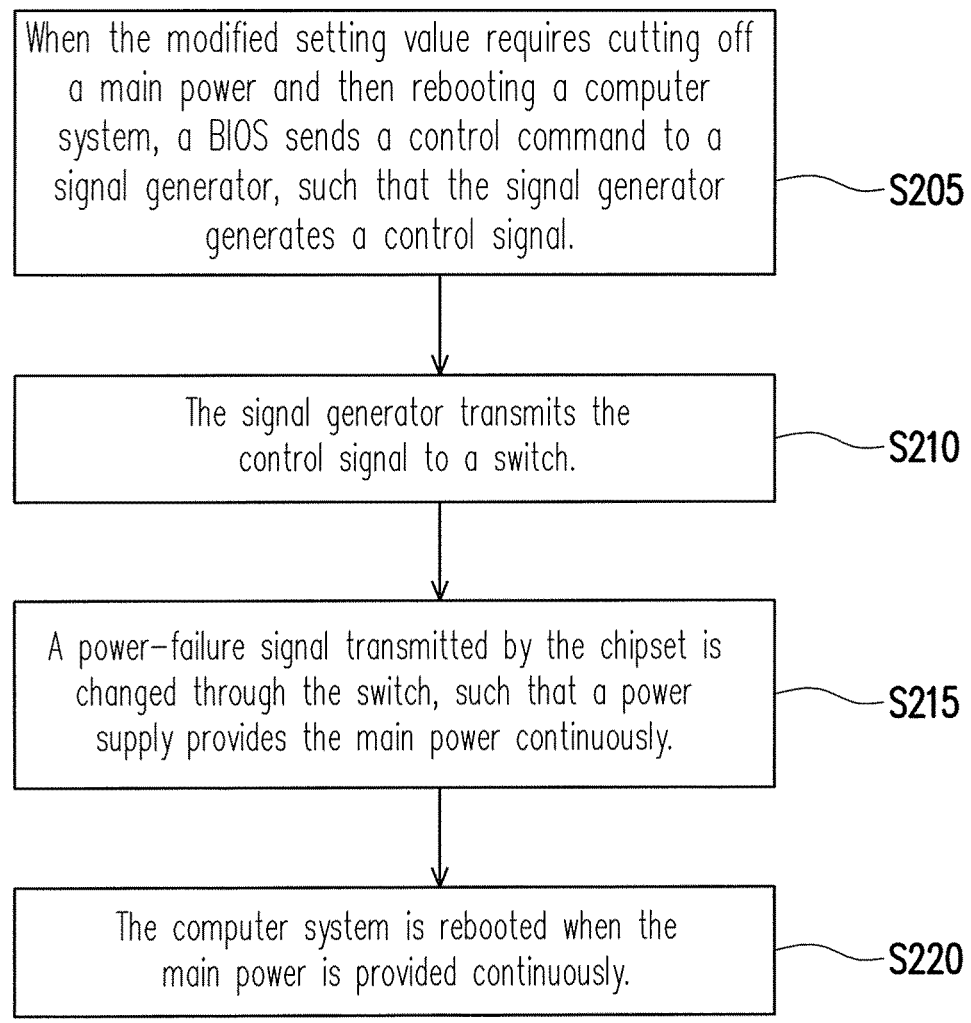
FIG. 2 is a flow chart of a booting method according to an embodiment of the present invention.

The steps of rebooting the computer system 100 without turn off the power after the setting value of the BIOS 110 is modified are described herein below together with the above computer system 100. FIG. 2 is a flow chart of a booting method according to an embodiment of the present invention. Referring to FIGS. 1A, 1B, and 2 together, firstly, in Step S205, when the modified setting value requires cutting off the main power and then rebooting the computer system 100, the BIOS 110 sends the control command to the signal generator 140, such that the signal generator 140 generates the control signal. In other words, the signal generator 140 transmits the control signal according to the control command.

Then, in Step S210, the signal generator 140 transmits the control signal to the switch 150, so as to turn on the switch 150. In other words, the original state of the switch 150 is turned off, and the switch 150 is not turned on until it receives the control signal.

Thereafter, as shown in Step S215, the power-failure signal transmitted by the chipset 120 is changed through the switch 150, such that the power supply provides the main power continuously. In this embodiment, when the switch 150 is turned on, the power-failure signal transmitted by the chipset 120 is changed to become invalid. Therefore, by turning on the switch 150, the power supply 130 does not receive the power-failure signal about cutting off the main power, thereby providing the power continuously.

In particular, as shown in FIG. 1B, when the control signal received by the node N1 is at a high logic level, the switch 150 is turned on. Since the switch 150 is turned on, when the power-failure signal transmitted by the chipset 120 is transmitted to the node N2, the level thereof is pulled to the ground level, so as to become a signal at a low logic level.

Moreover, after sending the control command to the signal generator 140, the BIOS 110 further sends the power-failure signal to the chipset 130. Therefore, the chipset 130 gets to know that the setting value of the basic input output system has been modified, so as to execute operations of the modified setting value.

Finally, in Step S220, when the power supply 130 provides the main power continuously, the computer system 100 is rebooted, and in this case, the rebooting process is similar or identical to a common booting process, which thus will not be repeated herein.

Figure 3:
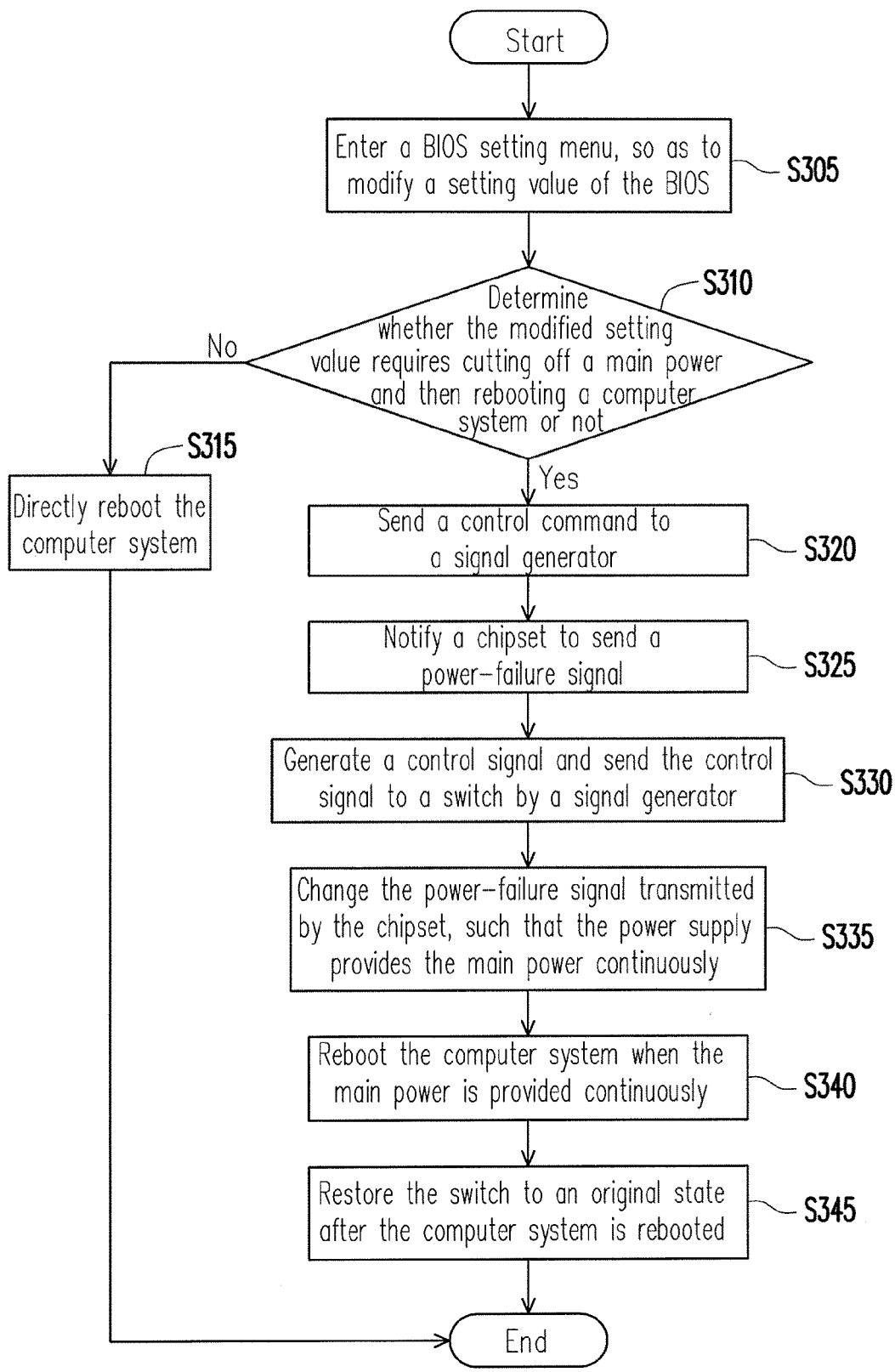
FIG. 3 is a flow chart of a booting method according to another embodiment of the present invention.

Another embodiment is illustrated herein below to describe the steps of rebooting a computer system after the setting value of the BIOS 110 is modified. FIG. 3 is a flow chart of a booting method according to another embodiment of the present invention. Referring to FIGS. 1A and 3, in Step S305, a user enters a BIOS setting menu, so as to modify a setting value of the BIOS 110.

In particular, when the computer system 100 is started, the BIOS 110 is started first to execute a power on self test (POST). During the POST process, the user may enter the BIOS setting menu by pressing the Delete key on the keyboard to modify a setting value. After the modification is finished, the user stores the setting and then exits the setting menu.

Then, in Step S310, the BIOS 110 determines whether the modified setting value requires cutting off the main power and then rebooting the computer system 100 or not. For example, the setting values of the basic input output system are classified into two classes, namely, a class "requiring turn off the power and rebooting the computer system", and a class "not requiring turn off the power and rebooting the computer system", the BIOS 110 can get to know the class of the modified setting value merely by comparing the currently modified setting value with the above two classes of setting values. When the BIOS 110 determines that the modified setting value requires turn off the power and then rebooting the computer system, Step S320 is performed. When the BIOS 110 determines that the modified setting value does not require turn off the power and then rebooting the computer system, Step S315 is performed.

In Step S315, as the rebooting of the system can be performed without turn off the power, the BIOS 110 reboots the computer system 100 according to a common rebooting process. The Step S320 is similar or identical to the above Step S205, in which the BIOS 110 first sends the control command to the signal generator 140. After the BIOS 110 sends the control command, in Step S325, the BIOS 110 further sends the power-failure signal to the chipset 120, such that the chipset 120 sends the power-failure signal.

Thereafter, in Step S330, the signal generator 140 receives the control command, so as to generate the control signal and send the control signal to the switch 150. Then, as shown in Step S335, after the switch 150 receives the control signal, the power-failure signal is changed into another signal for enabling the power supply 130 to provide power continuously and then the signal is output to the power supply 130. The Step S330 and Step S335 in this embodiment are respectively identical or similar to the above Step S210 and Step S215, which thus will not be repeated herein.

After the power supply 130 receives the signal for providing power continuously, as shown in Step S340, the computer system 100 is rebooted under the circumstance that the main power is provided continuously.

In order to avoid the situation that the power of the computer system 100 cannot be cut off when it is really required to be cut off (for example, powering off), after the computer system 101 is rebooted, as shown in Step S345, the switch 150 is turned on in advance to change the power-failure signal, and thus, after the system is rebooted, the BIOS 110 further sends a restore signal to the signal generator 140. After receiving the restore command, the signal generator 140 generates a restore signal and sends the restore signal to the switch 150, so as to store the switch 150 to the original state that does not change the power-failure signal. Therefore, the computer system 100 can turn off the power supply.

In view of the above, the present invention utilizes a switch to change the power-failure signal transmitted by the chipset, such that the power-failure signal cannot be transmitted to the power supply, and thus the power supply provides the power continuously. Moreover, after the setting value is modified and the system is rebooted, the switch is restored to the original state. Therefore, when the setting value of the BIOS is modified, the motion of frequent turn off the power and rebooting the computer system may be avoided, thereby further reducing the damage to other hardware devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
    a power supply, for providing a main power;
    a basic input output system (BIOS), for determining a modified setting value of the BIOS requires cutting off the main power and rebooting the computer system, and sending a control command when the modified setting value requires cutting off the main power and rebooting the computer system;
    a chipset, coupled to the BIOS and the power supply respectively, for transmitting a power-failure signal;
    a signal generator, coupled to the BIOS, for receiving the control command to generate a control signal; and
    a switch, coupled to the signal generator, and coupled between the chipset and the power supply, for receiving the control signal to change the power-failure signal, such that the power supply provides the main power to the computer system continuously to reboot the computer system with the main power even when the BIOS has determined to require cutting off the main power to reboot the computer system.

2. The computer system according to claim 1, wherein the BIOS further sends a restore command to the signal generator, such that the signal generator sends a restore signal to the switch to restore the switch to an original state, and the power supply receives the power-failure signal sent from the chipset.

3. The computer system according to claim 1, wherein after sending the control command, the BIOS further sends a power-failure signal to the chipset, such that the chipset transmits the power-failure signal.

4. The computer system according to claim 1, wherein the switch is a metal oxide semiconductor (MOS) transistor or a bipolar junction transistor (BJT).

5. The computer system according to claim 1, wherein the chipset is a south/north bridge chipset.

6. The computer system according to claim 1, wherein the signal generator is a super input output (SIO) chip.

7. A booting method, applicable for rebooting a computer system when a setting value of a basic input output system (BIOS) is modified, comprising:

determining the modified setting value;

sending a control command to a signal generator when a main power needs to be cut off, such that the signal generator generates a control signal;

transmitting the control signal to a switch through the signal generator;

changing a power-failure signal transmitted by a chipset through the switch, such that a power supply provides the main power continuously; and rebooting the computer system with the main power although the BIOS has determined to require cutting off the main power to reboot the computer system.

8. The booting method according to claim 7, wherein when it is determined that the main power does not need to be cut off after the setting value is modified, the computer system is rebooted directly.

9. The booting method according to claim 7, after the step of sending the control command to the signal generator, further comprising:

sending a power-failure signal to the chipset, such that the chipset sends the power-failure signal.

10. The booting method according to claim 7, after the step of rebooting the computer system, further comprising:

sending a restore command to the signal generator, such that the signal generator sends a restore signal to the switch to restore the switch to an original state, and the power supply receives the power-failure signal.

11. The booting method according to claim 7, wherein the switch is a metal oxide semiconductor (MOS) transistor or a bipolar junction transistor (BJT).

\* \* \* \* \*